Feb. 5, 1935.  G. E. KERSHAW  1,990,077
PROCESS FOR JOINING PIPES
Filed Feb. 17, 1930
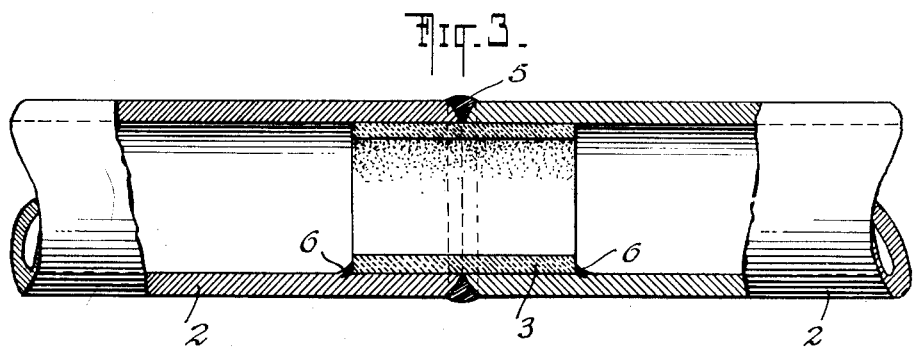
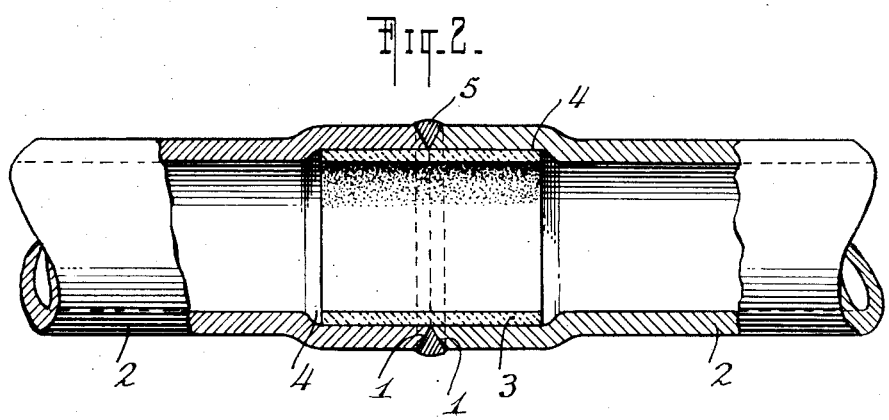
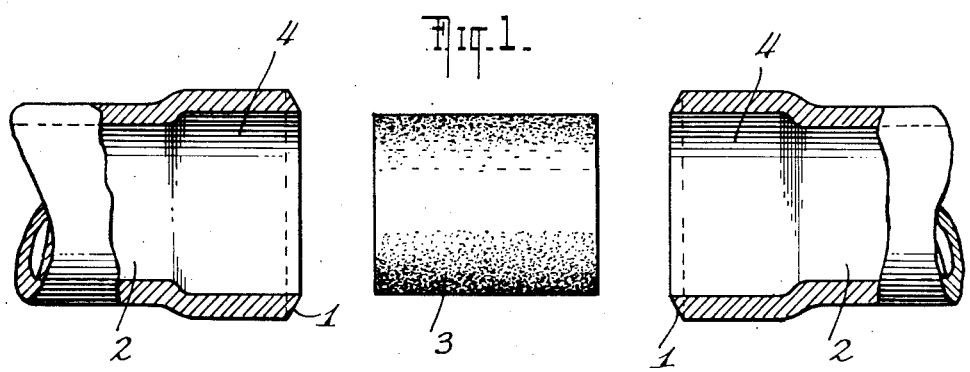
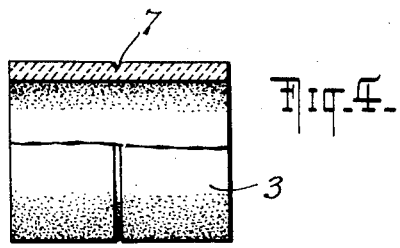
INVENTOR
GEORGE E. KERSHAW
BY
ATTORNEY

UNITED STATES PATENT OFFICE 1,990,077

PROCESS FOR JOINING PIPES

George E. Kershaw, East Orange, N. J., assignor to The Superheater Company, New York, N. Y.

Application February 17, 1930, Serial No. 429,031

2 Claims. (Cl. 113—112)

This invention relates to the art of joining pipes and more particularly to the art of joining them by autogenous welding.

In welding thin or relatively thin sheets to each other, such for example as the walls of pipes the edges that are to be welded together are, according to common practice, beveled or chamfered off so as to present an open V to the operator into which additional metal for making the joint is introduced during the welding operation. When one pipe is joined to another in this manner it is quite commonly the case that some of the melted material finds its way through the bottom of the V into the interior of the pipe where it forms a burr which obstructs more or less the interior of the pipe. Usually this is highly objectionable. The present invention has for its purpose the prevention of the formation of such a burr.

The invention is illustrated in the accompanying drawing in which Fig. 1 illustrates two pipe ends which are to be joined to each other, and a sleeve which I employ in the practice of my invention. The two pipe ends and the sleeve are shown before being placed into final position.

Fig. 2 shows the pipes assembled, the sleeve in position and the weld completed.

Fig. 3 illustrates a variation in view similar to that of Fig. 2. Fig. 4 illustrates a further variation.

An inspection of Fig. 1 will show the scarfed end 1—1 of the two pipes 2—2 which are to be joined. A sleeve 3 of an interior diameter the same as the interior diameter of the pipes 2—2 is shown between the two pipes. The pipes 2—2 are belled out at 4—4 to such an extent that the sleeve 3 can just be slipped into these belled out portions. The distance to which they are belled out is such as to accommodate the length of the sleeve 3.

The material of which the sleeve 3 is made depends upon the conditions under which the finished article is to be used. In any event, it must be a material that resists heat. It may or may not be left in place after the joint is made, as will be explained more fully below. In case it is to remain in place it must be hard enough to remain intact in use and must be of such material that it will not disintegrate under the influence of the fluid flowing through the pipe later on.

To connect the pipes, the pipe edges are brought together, the sleeve having been put into place, and the operator then proceeds in the usual way to weld the edges together, as indicated at 5 in Fig. 2. This figure shows the completed joint in longitudinal section with the sleeve 3 in place.

The purpose of the sleeve 3 is to prevent any of the melted material from reaching the interior of the pipes and there forming a burr or obstruction.

In the variation shown in Fig. 3 it will be noted that the pipes are not belled out, the sleeve being inserted into the pipes in their original form, the ends merely having been beveled off. To keep the sleeve in position during the welding operation the pipe is preferably burred up at the points 6—6 by a slight amount. This can readily be done by means of a chisel.

It will be noted that the exterior diameter of the sleeve 3 is in this case such that the sleeve fits snugly into the pipes. The rest of the procedure is just as that described first, the weld 5 being made with the sleeve 3 in place, the latter preventing any of the melted material from getting to the inside of the pipe and forming an obstruction.

When a weld is made with the pipes of the shape shown in Fig. 3 it is ordinarily necessary to remove the sleeve 3. If the sleeve is readily accessible from the end of one of the pipes, or from the ends of both of them, and particularly if the pipes are straight, it will be an easy matter to remove the sleeve by mechanical means, as for instance with a long rod after the joint has been finished. In such cases the sleeve can be of any refractory material desired. The sleeve may be broken up during removal, and ordinarily this will be the case.

Where, however, the sleeve is not readily accessible from the ends of the pipes and the sleeve still has to be removed, I provide for this by making the sleeve of a material which is strong enough to resist breakage during the welding operation and yet will disintegrate or dissolve when water, steam or some other fluid is forced through the pipes after the joint is finished. Ordinary plastic fine-grained refractory material such as is used for closing up crevices in furnace settings answers these requirements completely. Such material is readily formed into the sleeves of the required shape and size, and after being thoroughly air-dried will be strong enough to stand up during the welding operation and will not set or bake from the heat transmitted to the sleeve during the operation so as to become difficult to remove as described. The medium used for removal will depend upon circumstances.

It will be clear that if it is desired to remove the sleeve in the forms of Figs. 1 and 2, this can likewise readily be done by selecting material for the sleeve such as indicated in connection with the description of Fig. 3.

When the sleeve is to be removed it will be obvious that its thickness is immaterial and in fact that instead of being tubular it may have no openings through it at all, or in other words, be a solid plug.

I am aware that it has heretofore been suggested to make pipe joints by welding as in the present instance and to insert a metallic sleeve into the interior of the pipes before the welding. This, however, has not proved satisfactory. If the sleeve is thin it is always likely to be burned through in spots so that melted material will enter the interior of the sleeve and there form an obstruction. And where the sleeve has been chosen thick enough to obviate this burning through and to result in a joint where the sleeve, the two pipes and the added material all become unitary, the resulting joint is objectionable because of the open ended space between the sleeve and the pipe. Such a space is almost invariably the source of corrosion and joints made by the former method have proved entirely unsatisfactory. With the sleeve made of a refractory however, as in my invention, no corrosion sets in when the sleeve is left in the jointed pipes.

It is quite likely that in making the joint as above described, instead of the metal penetrating and flowing into the interior and there forming a burr, there will in some cases actually be left a small circumferential space or pocket unfilled by metal. To obviate this in cases where complete penetration is important, I score the sleeve slightly along the circumferential line which will lie opposite the weld. This is indicated at 7 in Fig. 4. The melted metal will not fill this groove but the metal will penetrate to the inner surface of the pipe walls, and the groove will be the unfilled pocket.

I claim:

1. The process for joining pipes autogenously, comprising scarfing the ends of two pipes to be joined, assembling them in their intended relative position, forming a non-fusible plug or sleeve of an external diameter equal to the internal diameter of the pipes and with a slight circumferential groove, inserting the plug in the pipes so the groove is opposite the line of contact of the ends, and autogenously welding the ends of the pipes.

2. The process for joining pipes autogenously comprising assembling the pipes to be joined in their intended relative position with a non-fusible plug extending into each for a distance from the point of joining and in contact throughout its circumference and length with the walls, autogenously welding the pipes together whereby a flow of melted material into the interior of the pipes during welding is prevented, and removing the plug after the weld is made by forcing a fluid through the pipes that will disintegrate the plug.

GEORGE E. KERSHAW.